United States Patent [19]

Schoenberg

[11] 4,381,100

[45] Apr. 26, 1983

[54] VALVE AND VALVING APPARATUS

[75] Inventor: John Schoenberg, Redondo Beach, Calif.

[73] Assignee: Fairchild Industries, Inc., Germantown, Md.

[21] Appl. No.: 222,147

[22] Filed: Jan. 2, 1981

[51] Int. Cl.³ .......................... F16K 3/00; F16K 25/00
[52] U.S. Cl. ................................. 251/368; 251/167; 251/175; 251/195; 251/302; 251/328; 137/554
[58] Field of Search ............... 251/167, 175, 327, 328, 251/302, 368, 195; 137/554

[56] References Cited

U.S. PATENT DOCUMENTS

| | | | |
|---|---|---|---|
| 3,040,773 | 6/1962 | McInerney | 251/195 |
| 3,842,861 | 10/1974 | Jandrasi et al. | 251/302 |
| 3,973,753 | 8/1976 | Wheeler | 251/368 |
| 4,062,515 | 12/1977 | Bobo | 251/167 |
| 4,157,169 | 6/1979 | Norman | 251/167 |
| 4,198,030 | 4/1980 | Jackson et al. | 137/554 |
| 4,244,557 | 1/1981 | Polhede et al. | 251/167 |

FOREIGN PATENT DOCUMENTS 759785 8/1980 U.S.S.R. .............................. 251/302

Primary Examiner—A. Michael Chambers

Attorney, Agent, or Firm—Michael W. York

[57] ABSTRACT

A gate valve having an expandable valve closure apparatus which is capable of expanding to seal two oppositely located parts in its valve housing. The expandable valve closure apparatus if pivotally mounted for movement on the end of a swing arm member to permit the expandable valve closure apparatus to be moved from its operative position in the vicinity of the ports in the valve housing to its inoperative or stowed position within the valve housing. Expansion of the expandable valve closure apparatus is accomplished by compressed air that is fed into a bellows that forms part of the expandable valve closure apparatus. Contraction of the expandable valve closure apparatus is accomplished by permitting the compressed air to be released from within the bellows and by springs which form part of the expandable valve closure apparatus. Air pressure is also utilized to move the expandable valve closure apparatus from its operative to its inoperative position and from its inoperative to the operative position. The expandable valve closure apparatus employs two belleville type valve closure members that each employ two outer peripheral sealing ridges and an outer peripheral portion that is plated with gold.

3 Claims, 10 Drawing Figures

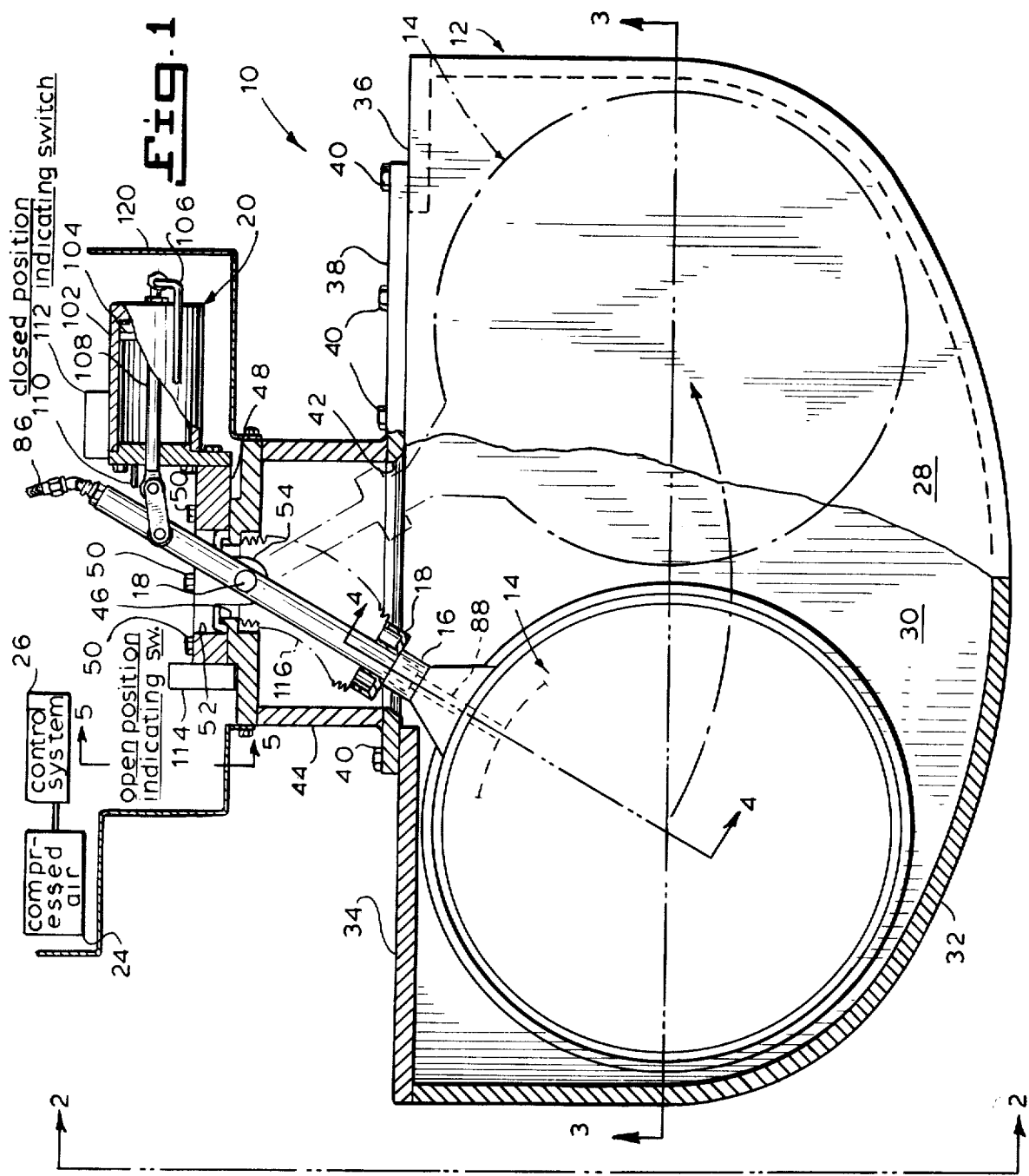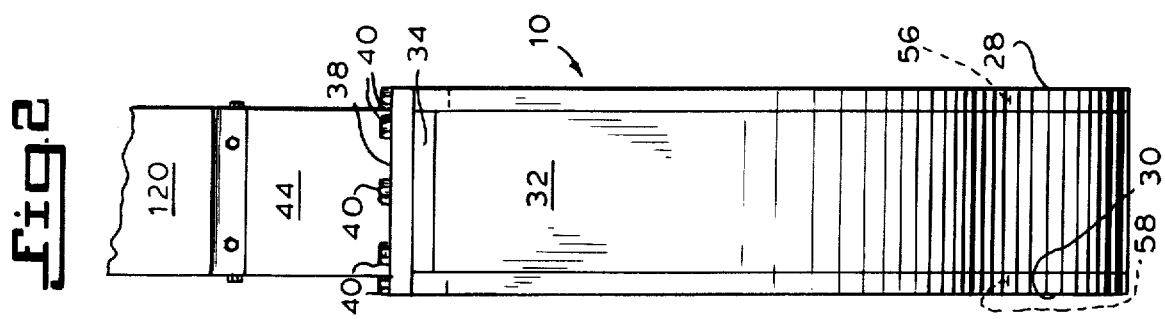

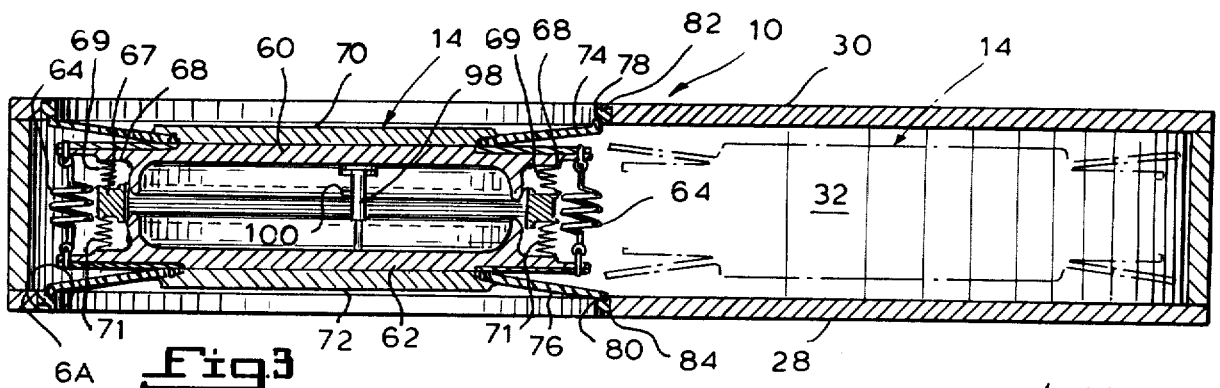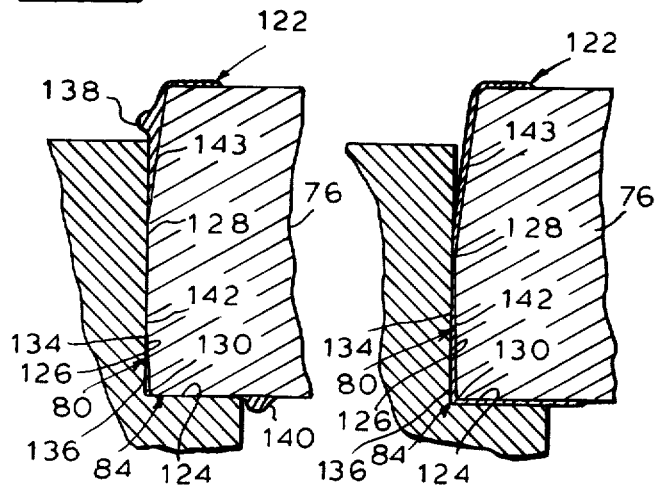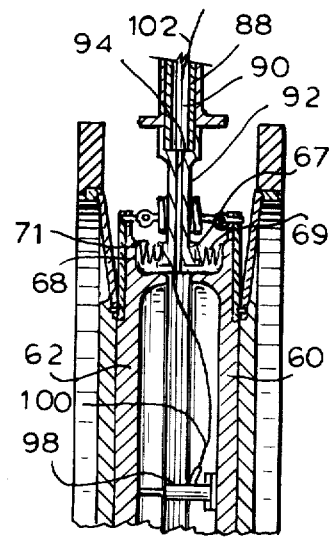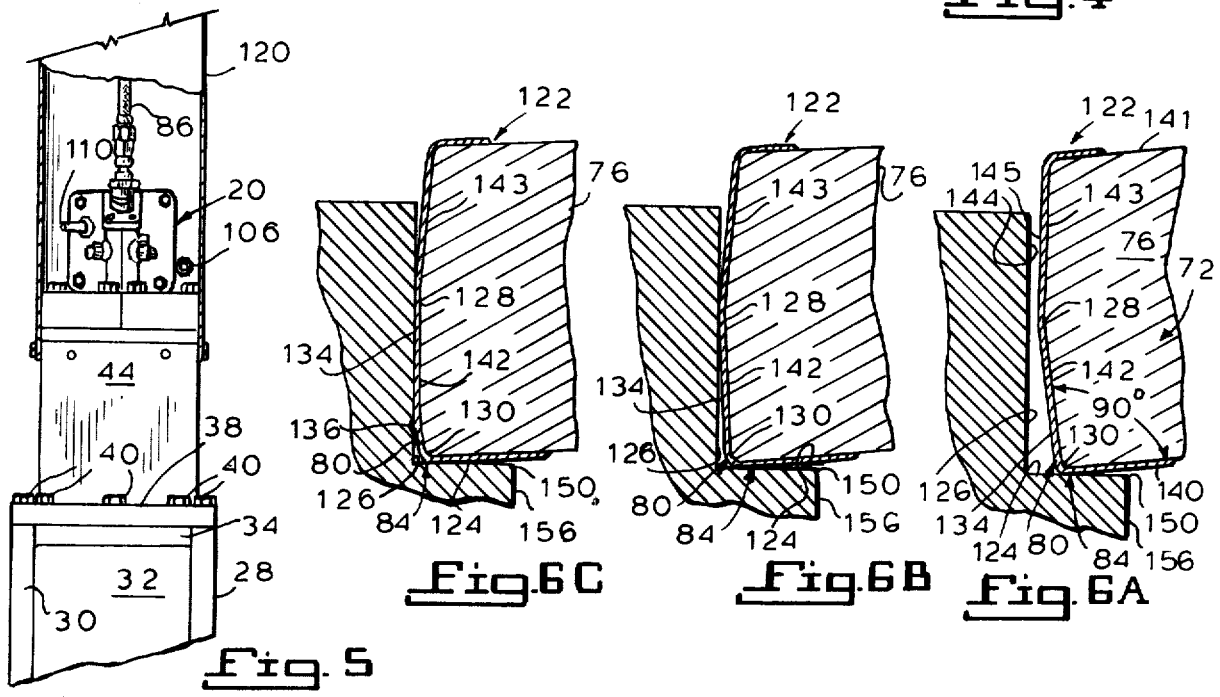

VALVE AND VALVING APPARATUS

BACKGROUND OF THE INVENTION

It has long been recognized that it is necessary or desirable to have valves and valving apparatus that result in a good seal when the valve or valving apparatus is in its closed position. This is particularly true when such valves or valving apparatus are desired to be utilized in ultra high vacuum systems. It has also been recognized that the gate valve due to its clear aperture and its short length between flanges is highly desirable for such vacuum applications. It is also desirable to utilize a valve which does not have an elastomeric type seal since such a seal is generally not useful in ultra high vacuum systems due to outgassing and sensitivity to bake-out at higher temperatures used in the process to remove gas and facilitate the reduction of pressure. Consequently, an all metal valve is desired for such ultra high vacuum use.

It is known in the prior art that it is desirable to utilize some type of noble metal coating on appropriate portions of metal valves in order to assist in effecting a good seal when the valve or valving apparatus is in its closed position. For instance, U.S. Pat. No. 1,771,043 discloses a valve with a metal valve closure member that is provided with a seat that is composed of a noble metal. U.S. Pat. No. 4,044,993 discloses a high vacuum gate valve in which the valve closure member is plated with gold plating. This gold plating deforms under force to provide a fluid tight seal when the valve closure member is in the seated position. Unfortunately, with the type of valve apparatus shown in this patent, the gold plating does not remain in its original position on the valve closure member after the valve closure member is subjected to repeated use. Instead, the gold plating tends to flow away from the location on the valve closure member that comes into contact with the valve seat. As a consequence, the valve will begin to leak after it has been subjected to repeated use and such a valve has a very limited life. After such a valve has been subjected to a few hundred cycles, the noble metal coating has been so progressively squeezed out from between the mating surface that it is so thin as to be ineffective to effect a statisfactory seal. At that time such a valve must be replaced or repaired by replating the noble metal onto the appropriate portion of the valve closure member.

The valve and valving apparatus of this invention overcomes the problems associated with such prior art valves that utilize noble metal coatings on sealing surfaces and with the valve and valving apparatus of this invention, it is possible to have a valve that can be subjected to thousands of cycles without any diminished ability to properly provide a seal when the valve or valving apparatus is in its closed position.

BRIEF DESCRIPTION OF THE INVENTION

This invention relates to valve and valving apparatus and more particularly, to valve and valving apparatus that utilizes a noble metal coating.

It is an object of the present invention to provide valve and valving apparatus that are capable of repeated use.

It is also an object of the present invention to provide valve and valving apparatus that are useful in ultra high vacuum applications.

It is also an object of the present invention to provide valve and valving apparatus in which noble metal does not tend to become progressively squeezed from between mating surfaces.

It is also an object of the present invention to provide valve and valving apparatus in which noble metal is trapped to prevent it from progressively being squeezed out from between mating surfaces.

It is a further object of the present invention to provide valve and valving apparatus that requires no highly finished valve seat.

It is a further object of the present invention to provide valve and valving apparatus that can be utilized to effect a good seal even when the valve seat is rough or has been subjected to damage.

It is also an object of the present invention to provide valve and valving apparatus in which the noble metal coating does not tend to become detached.

It is also an object of the present invention to provide valve and valving apparatus in which the valve seat does not tend to become damaged after repeated use.

BRIEF DESCRIPTION OF THE DRAWINGS

The invention will be hereinafter more fully described with reference to the accompanying drawings in which:

FIG. 1 is a side elevational view of the valve apparatus of the present invention with certain portions thereof broken away;

FIG. 2 is an end elevational view of the apparatus illustrated in FIG. 1 taken along the line of 2—2 thereof;

FIG. 3 is a sectional view taken on the line 3—3 of FIG. 1 illustrating a valve member in its alternative positions;

FIG. 4 is a sectional view taken along the line 4—4 of FIG. 1;

FIG. 5 is an enlarged view taken along the line 5—5 of FIG. 1;

FIG. 6A is an enlarged view of a portion of the structure illustrated in FIG. 3 taken within the circle 6A thereof illustrating a closure member and a valve seat;

FIG. 6B illustrates the apparatus of FIG. 6A with the closure member in its partially seated position in the valve seat;

FIG. 6C illustrates the apparatus of FIG. 6B with the closure member in its fully seated position in the valve seat;

FIG. 7A illustrates the apparatus of FIG. 6B in its theoretical, void free sealing condition with the valve closure member engaging the valve seat; and FIG. 7B illustrates the structure of FIG. 7A with the valve member engaging the valve seat after the theoretical useful life of the valve member.

DETAILED DESCRIPTION OF THE PREFERRED EMBODIMENT

Referring first to FIGS. 1 through 3 the valve apparatus of the present invention is illustrated and is designated generally by the number 10. The valve apparatus 10 comprises a valve housing 12 and a rotatable and expandable valve closure member 14. The valve closure member 14 is located on the outer end portion of an elongated swinging arm member 16 which is rotated on the pivot pin 18. In view of this arrangement as best illustrated in FIG. 1 the valve closure member 14 can be pivoted into the alternate position illustrated by the phantom lines. In order to cause the valve closure member 14 to be pivoted into one of its alternative positions a pneumatic actuator system 20 is provided that is located adjacent to and is connected to a portion of the housing 12. The pneumatic actuator system 20 is in turn connected to the outer end portion of the swing arm member 16 by a linkage member 22. The pneumatic actuator system 20 is in turn connected to a source of compressed air 24 through a pneumatic control system 26, which is well known in the art and does not form a portion of the present invention.

The housing 12 comprises forward and back substantially flat plate members 28 and 30 whose edges are welded to a curved generally U-shaped member 32. The plate members 28 and 30 are also welded at their upper end portions to edges of flat plate members 34 and 36 and these flat members 34 and 36 partially close the upper portion of the housing 12. A substantially flat access cover 38 is bolted to the flat plate members 34 and 36 by the bolts designated by the number 40. This access cover 38 provides access to the interior of the welded housing assembly 12 when the bolts 40 are removed. The importance of having ready access to the interior of the housing 12 will be hereinafter described in further detail. The removable access cover 38 has a generally rectangular shaped aperture 42 extending through it and a hollow generally rectangular shaped swing arm housing portion 44 has its lower edges welded to the access cover 38 in the vicinity of the aperture 42. Located in the upper end portion of the swing arm housing 44 is an aperture 46 and a pneumatic actuator assembly and swing arm member mounting member 48 is bolted to the swing arm housing 44 in the vicinity of this aperture 46 by means of the bolts 50. The mounting member 48 itself has a generally centrally located aperture 52 which accommodates the central portion of the swing arm member 16 and located adjacent to this aperture 52 is a downward extending clevis 54 that receives an end of the pivot pin 18 to permit the swing arm member to pivot about the pin 18. The pneumatic actuator system is connected to one end of the member 48 by bolts 54.

As best illustrated in FIG. 2 the plates 28 and 30 have their respective apertures or ports 56 and 58 that are located substantially opposite from each other. In actual use these ports 56 and 58 would be connected to some hollow tubular conduit or the like so that the fluid could pass through a conduit and one of the ports into the housing 12 and out of the other port and into another conduit. For reasons that will be hereinafter more fully described in detail it is essential that these conduits or ports 56 and 58 be so positioned in the plates 28 and 30 that they are substantially opposite each other.

FIG. 3 illustrates further details of the valve closure apparatus 14. The valve closure apparatus 14 comprises a rigid substantially disc shaped member 60 that has a substantially flat outer surface and another rigid disc shaped member 62 that also has a substantially flat outer surface. These members are spaced apart from each other but are located opposite each other and are biassed towards each other by springs 64 that have their respective ends connected to the outer periphery of the respective disc shaped members 60 and 62. A generally ring shaped bellows inner ring member 67 is located between the disc shaped members 60 and 62 and this inner ring member 67 is connected to the edges of the disc shaped members 60 and 62 by the respective generally ring shaped bellows 69 and 71. It should be noted that the respective edges of the bellows 69 and 71 are welded to the respective member 60 and the inner ring member 67 and the member 62 and the inner ring member 67. This combination of the members 60 and 62, the inner ring member 67 and the connected bellows 69 and 71 provides a leak tight chamber between the members 60 and 62.

A conical disc shaped valve closure member 70 is connected to the flat outer surface of the member 60 through suitable means such as bolts or the like and in a similar manner another disc shaped valve closure member 72 is connected to the outer substantially flat surface of the member 60. These members 70 and 72 have respective outer periphery portions 74 and 76 that are shaped and made of a material that permits them to flex. The outer end portions 78 and 80 of the respective periphery 74 and 76 are shaped to be received by respective circular valve seats 82 and 84 that are located in the respective plate members 28 and 30. As illustrated in the solid lines in FIG. 3, when a fluid such as air or the like is introduced between the members 60 and 62 in a manner which will hereinafter be described in further detail, this forces the respective members 60 and 70 and 62 and 72 outward so that the outer portions 78 and 80 engage the respective valve seats 82 and 84. The continued outer movement of the respective members 70 and 72 will cause the respected outer periphery 74 and 76 to flex to form an effective seal in the respective ports 56 and 58. In a similar manner, when a fluid is withdrawn from between the members 60 and 62, the springs 64 cause the respective members 60 and 70 and 62 and 72 to move together which unseals the respective ports 56 and 58. As illustrated in FIG. 3, the phantom lines illustrate the stowed valve closure apparatus 14. When this has occurred, the valve closure apparatus 14 is in its rotated position as illustrated in phantom lines in FIG. 1.

The fluid that is to be injected between the members 60 and 62 comes from the source of compressed air 24 and is controlled by pneumatic control system 26. The compressed air from the pneumatic control system 26 is fed through a conduit 66 to the outer end portion of the swing arm member 16. The compressed air from the conduit 86 then passes through a conduit 88 that is located substantially along the central axis of the swing arm 16 as best illustrated in FIG. 1. As illustrated in FIG. 4, the outer end portion 90 of the conduit 88 is connected to a projecting portion 92 of the inner ring member 67. This projecting portion 92 has an aperture 94 that is in fluid communication with the outer end portion 90 of the conduit 88 and as a consequence compressed air passes through the aperture 94 and into the chamber formed by the members 60 and 62, the ring member 67 and the ring shaped bellows 69 and 71 to force the members 60 and 62 outward which in turn results in the seating of the outer periphery portions 74 and 76 of the members 70 and 72 in the respective valve seats 82 and 84 to cause the valve closure apparatus to assume its extended or seated position. The same projecting portion 92 and conduit 88 in conjunction with the pneumatic control system 26 is utilized to expel air from between the members 60 and 62 when it is desired to have the valve closure apparatus 14 revert to its contracted position as illustrated in phantom lines in FIG. 3.

In order to provide an indication when the valve closure system is in its fully closed position closing the ports 56 and 58 as best illustrated in FIG. 3 and FIG. 4, a linear potentiometer or other similar sensing device 98 is located between the interior surface of the members 60 and 62. This sensing device 98 provides an indication when the members 60 and 62 have moved to their fully extended position when the valve closure apparatus 14 is in place sealing the ports 56 and 58 and the sensing device 98 also provides an indication when the valve closure apparatus 14 is in its collapsed configuration such as that illustrated in phantom lines in FIG. 3 and is not sealing the ports 56 and 58. It should be noted that the sensing device is connected through an electrical connector 100 which passes through the aperture 94 in the projection 92 to a suitable power supply and electrical indicating apparatus that are well known to those skilled in the art and hence are not shown.

As best illustrated in FIG. 1, the pneumatic actuator system 20 comprises a closed cylinder 102 that has a piston member 104 that is slidable within the cylinder. The outer end of the cylinder 102 has a conduit 106 extending into it from the pneumatic control system 26 so that compressed air from the source of compressed air 24 can be fed through the control system 26 and the conduit 106 into the outer end of the cylinder 102 to cause the piston 104 to move to the left as illustrated in FIG. 1 so that the connecting rod member 108, which is connected to the piston 104 and the linkage member 22, exerts pressure on the outer end portion of the swing arm 16 to cause the valve closure apparatus 14 to move into the position illustrated by the phantom lines in FIG. 1. In order to move the valve closure apparatus 14 from the position illustrated by the phantom lines in FIG. 1 a conduit 110 is provided that extends into the inner portion of cylinder 102. This conduit 110 is also connected to the pneumatic control system so that compressed air can be fed to the source of compressed air 24 through the pneumatic control system 26 and conduit 110 into the interior of the cylinder 102 to force the piston 104 to the right as illustrated in FIG. 1 which of course in view of the linkage member 22 and connecting rod 108 results in the outer end portion of the swing arm member 16 being pulled to the right so that the valve closure apparatus 14 moves to the position between the ports 56 and 58 as illustrated in solid lines in FIG. 1.

In order to provide an indication to operators or to personnel utilizing the valve apparatus 10 where the valve closure member is located indicator switches designated by the numbers 112 and 114 are located in the vicinity of the outer end portion of the swing arm member as illustrated in FIG. 1. For instance, the closed position indicating switch 112 is shown in FIG. 1 being contacted by the outer end portion of the swing arm member 16 so as to give an indication through apparatus known to one skilled in the art (not shown) that the valve closure apparatus 14 is located in position between the ports 56 and 58. In addition the open indicating switch 114 is located in position so that it will be contacted by the outer end portion of the swing arm member 16 when the valve closure apparatus 14 is located in the open position illustrated by the phantom lines in FIG. 1. This open position indicating switch 114 is also connected to suitable apparatus known to those skilled in the art (not shown) which will give an indication of the open location of the valve closure apparatus.

In order to prevent fluid such as air or the like from entering or leaving the interior of the housing 12 through the aperture 46 an isolation bellows 116 is provided that extends from the aperture 46 to a circular fitting 118 that fits around the outer portion of the swing arm 16. This bellows 116 prevents air or the like from entering aperture 46 but at the same time it permits the movement of the swing arm member 16. In order to protect the pneumatic actuator system 20 and the switches 112 and 114 a shroud 120 which can be made from sheet metal or the like extends upward from the upper end of the swing arm housing 44 and surrounds the switches and the pneumatic actuator system.

The details of the valving apparatus designated generally by the number 122 are best illustrated in FIGS. 6A, 6B, 6C, 7A and 7B. As illustrated in FIGS. 6A through 7B, the valve seat 84 which extends circumferentially around the aperature 56 in the plate 28 has a generally one half rectangular cross section and the valve seat 84 has a substantially flat annular bottom wall 124 and an adjoining cylindered side wall 126 which is located immediately adjacent to and substantially perpendicular to the bottom wall 124. In the preferred embodiment, the material from which the valve seat 84 is formed comprises 304L or 316 stainless steel.

As best illustrated in FIGS. 6A through 7B, the outer end portion 80 of the outer periphery 76 of the valve closure member 72 has a projecting ridge or raised portion 128 which has a shallow v-shaped cross section which is located and adapted to come into contact with the side wall 126 of the valve seat 84. FIG. 6A depicts the conical disc gate (Belleville spring) or valve closure member 72 in its free (as machined) state. The surfaces 140 and 141 are substantially parallel to each other, and the outside diameter surface 143 is substantially parallel to the center line of the valve member 72 and to the vertical valve seat wall 126. Surface 142 is machined at substantially right angles to the conical surface 140. Surfaces 142 and 143 intersect at a point that is substantially half way into the verticle wall of the seat 126, and thus these surfaces form a shallow "V". The diameter of the valve closure member 72 which terminates at the surface 145 is sized appropriately smaller than the seat diameter which terminates at the surface 144, consistent with the accuracy of alignment of the moving gate 72 with the stationary seat 84 and the radial expansion capacity for a given conical disc gate. When the seating force is applied to the conical disc gate 72 (Belleville gate), the cone of the disc decreases and its size in diameter increases narrowing the gap between the ridge 128 and the vertical seat wall 126. At the same time the angle between the surface 142 of the seat wall 126 decreases while the surface 143 ceases to be parallel to the seat wall 126. Consequently, with increasing seat force being applied to the gate, the relationship between the valve seat wall 126 and gate outer surfaces progresses to the conditions shown in FIG. 6B and 6C.

The outer end portion 80 of the valve closure member 72 has a noble metal coating 134. It is important that this coating be uniform and continuous and extend circumferentially around the outer surface of the outer end portion 80 between the ridges 128 and 130. In the preferred embodiment the uniform and continuous coating extends outward beyond the ridges 128 and 130. In this connection, as illustrated in FIGS. 6A through 7B, the coating should extend inward sufficiently so that it extends beyond the ridge 150 which is the ridge formed by the seat bottom 124 and the valve bore 156. Also in the preferred embodiment the noble metal coating comprises substantially pure gold which is between 0.002 and 0.004 of an inch thick in its original undeformed state. The ridges 128 and 130 trap and hold a portion of the gold coating 134 between the ridges 128 and 130 when the valve member 72 is being moved into position to seat the outer end portion 80 in the valve seat member 72 in a manner which will hereinafter be described in fuller detail.

It will of course be appreciated that the previous description with respect to the structure of the outer end portion 80 of the valve closure member 72 and its coating 134 and the associated valve seat 84 also apply to the substantially identical outer end portion 78 of the valve closure member 70 and the associated valve seat 82.

FIGS. 6A through 7B illustrate the sequence of operation of the valving apparatus 122. As illustrated in FIG. 6A the valving apparatus 122 which includes the valve closure member 72 is illustrated in its unloaded or unseated condition. In this condition the coated lower projection 130 on the outer periphery 76 of the valve closure member 72 is in contact with the bottom wall 124 of the valve seat 84. However, the coated projecting ridge 128 of the outer periphery 76 is not in contact with the side wall 126 of the valve seat 84. As a consequence no deformation of the nobel metal coating 134 has taken place. FIG. 6B illustrates valving apparatus 122 in its partially loaded or seated position. In this position both the coated ridges 128 and 130 of the outer periphery 76 of the valve closure member 72 are in contact with the respective walls 126 and 124 of the valve seat 84. In view of the load being exerted on the valve closure member 72 localized deformation of the nobel metal coating 134 in the vicinity of the ridges 128 and 130 may take place.

FIG. 6C illustrates the valve apparatus 122 in its fully loaded or seated condition. In this condition the respective coated ridges 128 and 130 of the outer periphery 76 of the closure member 72 contact the respective walls 126 and 124 of the valve seat 84. In addition the coated ridge 130 has been pushed closer to the wall 126 than it was in its unseated or partially seated condition as illustrated in the respective FIGS. 6A and 6B. In moving into this position a portion 136 of the noble metal coating 132 has been plastically deformed and trapped between the walls 126 and 124 of the valve seat 84 and between the ridges 128 and 130 of the outer periphery 76 of the valve closure member 72. As a consequence the valving apparatus 122 forms an extremely tight seal when in a configuration illustrated in FIG. 6C. When the valve closure member 72 is then placed in its unloaded condition the valving apparatus 122 assumes its original configuration illustrated in FIG. 6A.

Although FIGS. 6A through 6C illustrate the actual condition of the valving apparatus which was present for some 5000 sealing cycles in a valving apparatus that was constructed and tested, FIGS. 7A and 7B illustrate respectively the theoretical condition of the valving apparatus in its fully loaded or seated position and the condition of the valving apparatus 122 after its useful life. As illustrated in FIGS. 7A, theoretically when the valving apparatus 122 is in its fully loaded or seated position the plastically deformed portion 136 of the noble metal coating 132 that is located in the valve seat 84 between the walls 126 and 124 and the ridges 128 and 130 completely fills this area and is void free. Although this theoretical void free condition is seldom or ever actually reached the plastically deformed portion 135 is still in actual practice substantially void free and in practice this is proven to give an extremely effective seal. FIG. 7B illustrates the theoretical end of useful life of the valving apparatus 122. In this condition it should be noted that when the valving apparatus 122 is in its fully loaded or seated condition portions 138 and 140 of the noble metal coating 134 have been squeezed outward and away from the respective side wall 126 and bottom wall 124 of the valve seat 84. In this condition the valving apparatus will not provide effective sealing. This theoretical end of useful life condition has not been achieved in tests even though a valving apparatus 122 has been subjected to over 5,000 opening and closing cycles.

The valve apparatus 10 and the valving apparatus 122 are used in the following manner. The apertures 56 and 58 in the respective plates 28 and 30 are suitably connected to conduits (not shown) that are going to transmit and/or receive a fluid which are well known in the art. Usually the valve closure member 14 will be in the inoperative position illustrated in phantom lines in FIGS. 1 and 3. This valve closure member 14 is then moved into the operative position through the use of the pneumatic control system 26. By suitably activating the pneumatic control system 26 by means well known in the art compressed air is caused to flow from the source of compressed air 24 through the pneumatic control system 26 through the conduit 110 to the inner portion of the cylinder 102. This compressed air then acts upon the underside of the piston member 104 and causes it to move to the right as illustrated in FIG. 1. As a consequence the connecting rod member 108 and the associated linkage 22 is also caused to move to the right. This in turn results in the outer end of the swing arm member 16 being pulled to the right so that the entire swing arm member pivots above the pivot pin 18. As a consequence the valve closure member 14 is pulled into its operative position between the ports or apertures 56 and 58 as illustrated in solid lines in FIGS. 1 and 3.

The next step is usually to cause the valve closure member 14 to expand and to substantially simultaneously seal the aperture or ports 56 and 58 in the respective plates 28 and 30 of the valve housing 12. This is also accomplished in a manner known to those skilled in the art using the pneumatic control system 26. Through the proper operation of the pneumatic control system 26 compressed air is caused to flow from the source of compressed air 24 through the pneumatic control system 26 through a conduit 86 to the swing arm member. As best illustrated in FIG. 4 the compressed air then passes from the conduit 88 through the aperture 94 in the projection 92 into the space between the members 60 and 62 which forms part of the valve closure member 14. This compressed air between the members 60 and 62 exerts an outward pressure that forces the conical valve closure members 70 and 72 outward so that the respective outer end portions 78 and 80 engage the respective circular valve seats 80 and 82 that are located in the respective plate members 28 and 30. When the outer end portions 78 and 80 are fully seated in the respective valve seats 82 and 84 the sensing device 98 that is located inside the bellows 68 provides an indication that the valve closure apparatus 14 is in place sealing the ports 56 and 58.

As pressure is exerted to cause outward movement of the respective disc shaped valve closure members 70 and 72 sealing is accomplished between the outer end portions 78 and 80 and the respective valve seats 82 and 84 as will be described in connection with the valve seat 84 and the corresponding outer end portion 80. As illustrated in FIG. 6A the coated ridge 130 of the outer end portion 80 comes into initial contact with the annular bottom wall 124 of the valve seat as the compressed air exerts an outward pressure. Continued outward pressure then causes the coated ridge 130 to move further towards the cylindrical side wall 126 and the coated ridge 128 to move into contact with the cylindrical side wall 126. Continued outward pressure caused by the air contained between the members 60 and 62 causes the coated ridge 130 to move further towards the cylindrical wall 126 as illustrated in FIG. 6C so that a portion 136 of the noble metal 134 is trapped between the ridges 128 and 130 and a portion 136 of the cylindrical side wall 126 and the bottom wall 124. This results in sealing being accomplished between the outer end 80 of the valving closure member 72 and valve seat 84. It will of course be appreciated as this is occurring a similar sealing process will occur substantially simultaneously between the outer end portion 78 of the valving closure member 70 and the associated valve seat 82.

When it is desired to open the ports or apertures 56 and 58, compressed air is permitted to flow out from between the members 60 and 62 through the aperture 94 in the projection 92 into the conduit 88 and through the conduit 86. This compressed air then passes through the pneumatic control system and is discharged to the atmosphere or is otherwise disposed of. This permits the springs 64 and 66 to pull the valving closure members 70 and 72 together so that the outer end portions 78 and 80 are pulled away from their respective valve seats 82 and 84. As a consequence fluid is permitted to pass from suitable conduits through the respective ports 56 and 58. However, since the valve closure apparatus 14 is in the path of any such fluid that may flow between the ports 56 and 58 it is desirable to move the valving closure apparatus out of this flow.

In order to accomplish this the pneumatic control system 26 is suitably activated so that compressed air flows from the source of compressed air 24 through the pneumatic control system 26 through the conduit 106 into the outer interior of the inner portion of the cylinder 102. This compressed air forces the piston 104 and the associated connecting rod 108 and link 22 to the left as illustrated in FIG. 1. This results in force being applied to the outer end portion of the swing arm member 16 so that the swing arm member pivots about pivot pin 18 to cause the valving closure apparatus 14 to move into the stored or inoperative position illustrated in phantom lines in FIG. 1. When the valving closure apparatus 14 moves into this stored position it activates the open indicator switch 114 to indicate that the valving closure apparatus 14 is in its inoperative position. It will of course be appreciated that the above indicated cycle may be repeated numerous times.

Although the valving apparatus 10 has proven to be very reliable and to require very little or no service if for some reason the valving closure apparatus 14 must be inspected or repaired access to the valving closure apparatus 14 can be gained by removing the access cover 38. This is accomplished by removing the bolts 40 that connect the access cover 38 to the remainder of the valve housing 12. After the valving closure apparatus 14 has been removed from the housing it can be suitably repaired and then placed back in the housing and located in place by bolting the access plate 38 to the housing through the use of the bolts 40.

Although the invention has been described in considerable detail with reference to a certain preferred embodiment it will be understood that variations or modifications may be made within the spirit and scope of the invention as desire in the appended claims.

What is claimed is:

1. Apparatus for valving comprising a valve seat member having a circular valve seat having a generally circular flat bottom wall and a generally cylindrical side wall located immediately adjacent to the bottom wall, a valve closure member having a generally circular outer portion, and a noble metal coating covering at least a portion of the circular outer portion of said valve closure member, said generally circular outer portion having means for trapping a portion of said noble metal coating so that said trapped noble metal is plastically deformed to form a seal and is substantially void free as said valve closure member is moved to its seated position comprising two circular projections located on the generally circular outer portion of said valve closure member and a substantially smooth surface located between said circular projections, one of said projections being located to contact the side wall of said valve seat and the other projection being located to contact the bottom wall of said valve seat in order that said portion of the noble metal coating is plastically deformed and trapped between said projections and the side and bottom wall of said valve seat when said valve closure member is in its seated position, said generally circular outer portion of said valve closure member having an outer surface located at substantially a right angle to the smooth surface located between said circular projections and locatable adjacent to the bottom wall of said valve seat when said valve closure member is in its seated position.

2. The apparatus for valving of claim 1 wherein said noble metal coating is continuous and uniform.

3. The apparatus for valving of claim 2 wherein said noble metal coating comprises substantially pure gold that is between 0.002 to 0.004 of an inch thick in its undeformed state.

* * * * *